United States Patent [19]

Muraishi et al.

[11] Patent Number: 4,896,919
[45] Date of Patent: Jan. 30, 1990

[54] SEATBACK OF AUTOMOTIVE SEAT

[75] Inventors: Masakazu Muraishi, Isehara; Ichiro Matsuura, Kanagawa, both of Japan

[73] Assignee: Ikeda Bussan Co., Ltd., Ayase, Japan

[21] Appl. No.: 260,422

[22] Filed: Oct. 20, 1988

[30] Foreign Application Priority Data

Oct. 28, 1987 [JP] Japan ................... 62-164775

[51] Int. Cl.$^4$ ............................... A47C 7/26
[52] U.S. Cl. ................... 297/452; 297/191; 297/460
[58] Field of Search ............ 297/191, 218, 219, 452, 297/460

[56] References Cited

U.S. PATENT DOCUMENTS

| | | | |
|---|---|---|---|
| 2,170,224 | 8/1939 | Tarr | 297/218 |
| 3,479,085 | 11/1969 | Weinstein | 297/191 X |
| 3,519,308 | 7/1970 | Kasman et al. | 297/218 X |
| 3,827,752 | 8/1974 | Bissiages, Sr. | 297/216 X |
| 4,643,480 | 2/1987 | Morita | 297/218 |
| 4,725,094 | 2/1988 | Greer | 297/191 X |

FOREIGN PATENT DOCUMENTS 752275  2/1967  Canada ................... 297/218

OTHER PUBLICATIONS

Service Manual, vol. 549, Nissan Motor Co., Ltd., Feb. 1986, pp. D-34-D36.

Primary Examiner—Peter R. Brown
Attorney, Agent, or Firm—Foley & Lardner, Schwartz, Jeffery, Schwaab, Mack, Blumenthal & Evans

[57] ABSTRACT

A seatback of an automotive seat is disclosed which comprises a structural base including a rectangularly extending frame having opposed portions, and a plurality of springs extending between the opposed portions; a pad material covering the structural base except a given rear part of the structural base; a trimmed cover covering the pad material, the trimmed cover having a rear part by which the given rear part of the structural base is entirely covered, a bag member attached to an inner surface of the rear part; and a hardboard received in the bag.

4 Claims, 2 Drawing Sheets

SEATBACK OF AUTOMOTIVE SEAT

BACKGROUND OF THE INVENTION

1. Field of the Invention

The present invention relates in general to an automotive seat, and more particularly to a seatback of the seat, which has a decorative and steadily constructed rear surface.

2. Description of the Prior Art

In order to clarify the task of the present invention, one conventional seatback of an autumotive seat will be described with reference to FIGS. 4 and 5 of the accompanying drawings, which is disclosed in Service Manual Volume 549 issued Feb. 1986 from Nissan Motor Co., Ltd.

FIG. 4 shows the seat of the publication, which generally comprises a seat cushion 1, a seatback 2 and a reclining mechanism 3. By manipulating a control lever 3a of the reclining mechanism 3, the seatback 2 is inclinable forward or rearward to a desired angular position relative to the seat cushion 1.

As is seen from FIG. 5 which is a sectional view taken along the line V—V of FIG. 4, the seatback 2 comprises a rectangularly extending frame 4, a plurality of springs 5 expanding between opposed sides of the frame 4, a pad material 6 extending over the front side "FS" and right and left sides "RS" and "LS" of the springs 5 except the rear side "RS", and a trimmed cover 7 wholly covering the pad material 6.

However, due to its inherent construction, the above-mentioned seatback 2 has the following drawbacks.

That is, as is understood from FIG. 5, if the rear part of the trimmed cover 7 is pressed in such a manner as is shown by the arrow "A", the part is flexed or depressed easily to a considerable degree. This phenomenon brings about not only lowering in the external view of the seat but also lowering in stoutness of the trimmed cover 7 of the same.

SUMMARY OF THE INVENTION

Therefore, it is an object of the present invention to provide a seatback of an automotive seat, which is free of the above-mentioned drawbacks.

According to the present invention, there is provided a seatback of an automotive seat, which comprises a structural base including a rectangularly extending frame having opposed portions, and a plurality of springs extending between the opposed portions; a pad material covering the structural base except a given rear part of the structural base; a trimmed cover covering the pad material, the trimmed cover having a rear part by which the given rear part of the structural base is entirely covered; a bag member attached to an inner surface of the rear part; and a hardboard received in the bag.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
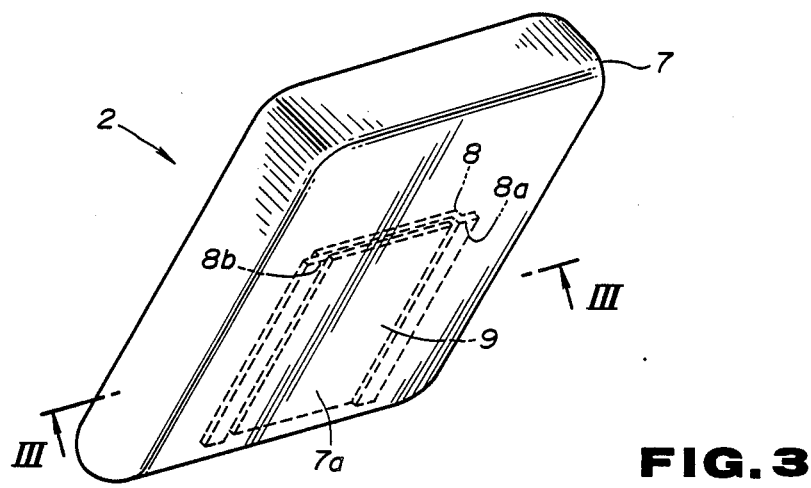
FIG. 1 is a perspective view of a seatback according to the present invention, showing an essential portion illustrated by broken lines.
Figure 3:
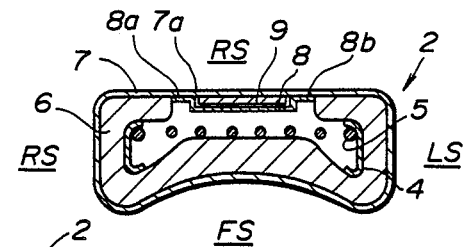
FIG. 3 is a sectional view taken along the line III—III of FIG. 1.
Figure 2:
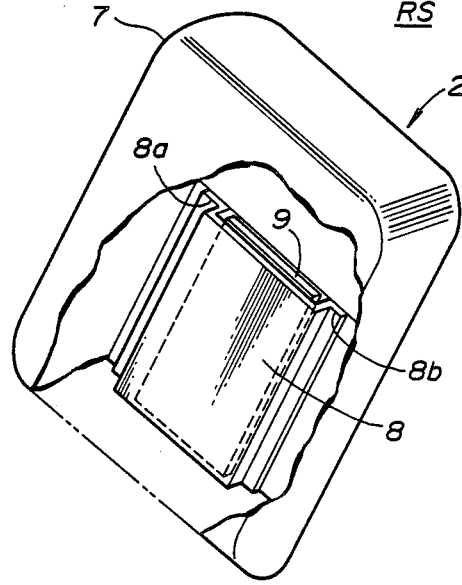
FIG. 2 is a perspective view of the seatback with a part broken for showing the interior of the same.
Figure 4:
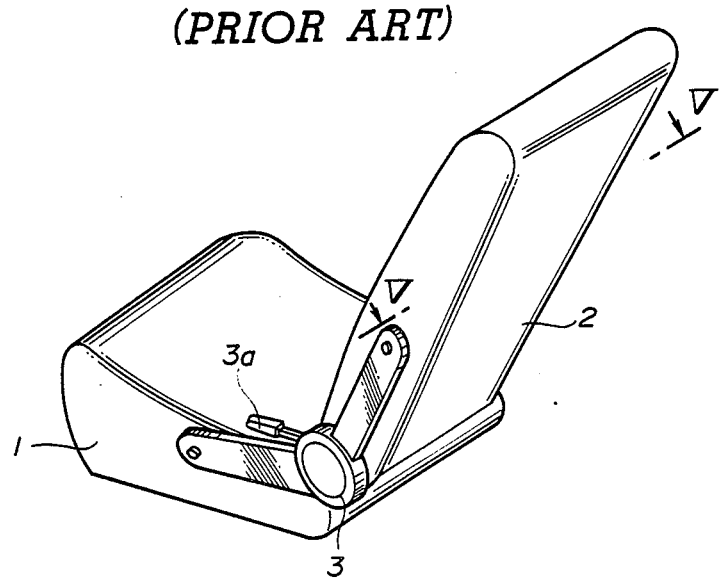
FIG. 4 is a perspective view of an automotive reclining seat equipped with a conventional seatback.
Figure 5:
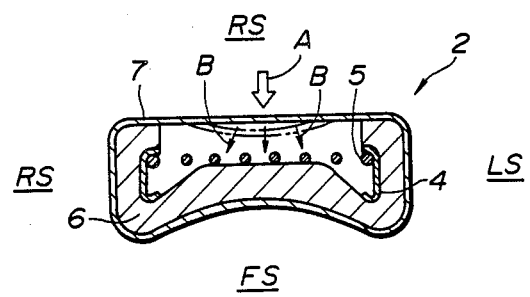
FIG. 5 is a sectional view taken along the line V—V of FIG. 4.

Referring to FIGS. 1, 2 and 3, there is shown a seatback 2 according to the present invention.

As is seen from FIG. 3, similar to the above-mentioned conventional one, the seatback 2 of the present invention comprises a rectangularly extending frame 4 and a plurality of springs 5 expanding between opposed sides of the frame 4. Thus, the frame 4 and the springs 5 constitute a structural base of the seatback 2. A pad material 6, such as urethane foam or the like, extends over a front side "FS" and right and left sides "RS" and "LS" of the structural base except a rear side "RS" of the same. A trimmed cover 7, such as a flexible plastic sheet or the like, wholly covers the pad material 6. That is, the trimmed cover 7 has a rear part 7a by which the rear part of the structural base is entirely covered, as shown. In the illustrated embodiment, rear parts of the pad material 6 extend somewhat toward each other.

As is well seen from FIGS. 1 and 2, the rear part 7a of the trimmed cover 7 is equipped at its inner surface with a rectangular bag member 8 which has side flange portions 8a and 8b secured, by means of a suitable adhesive or the like, to the rear part of the cover 7. A hardboard 9 having a desired stiffness is received in the bag member 8. Preferably, the hardboard 9 is constructed of a light paper board impregnated with plastics.

With the construction as mentioned hereinabove, the following advantage is given to the seatback 2.

That is, since the hardboard 9 is attached to the inner surface of the rear part 7a of the cover 7, the rear part 7a has a considerable durability against a pressure applied thereto from the outside. Thus, the afore-mentioned undesired phenomenon encountered in the conventional seatback never occurs. That is, the seatback of the present invention can bring about not only improvement in the external view of the seat but also increase in stoutness of the trimmed cover 7 of the same.

We claim:

1. A seatback of an automotive seat, comprising:
   a structural base including a rectangularly extending frame having opposed side portions, and a plurality of springs extending between said opposed side portions;
   a pad material covering said structural base except at a given rear part of said structural base;
   a flexible trimmed cover covering said pad material, said trimmed cover having a rear part by which said given rear part of said structural base is entirely covered;
   a rectangular bag member having side flange portions secured at its side flange portions to an inner surface of said rear part of said trimmed cover in a manner to define at an upper portion of said bag member an entrance into the interior of said bag member; and
   a rectangular hardboard member slidably insertable into the bag member through said entrance to allow said rear part of the trimmed cover to have considerable durability against pressure applied thereto from the outside, said hardboard being constructed of a light paper board impregnated with plastics.

2. A seatback as claimed in claim 1, in which said side flange portions of said bag member are secured to said rear part by means of adhesive.

3. A seatback as claimed in claim 1, in which said pad material is of a foamed polyurethane.

4. A seatback as claimed in claim 3, in which said trimmed cover is constructed of a flexible plastic sheet.

* * * * *